US011932167B2

(12) United States Patent
Polosajian

(10) Patent No.: US 11,932,167 B2
(45) Date of Patent: Mar. 19, 2024

(54) SYSTEM AND METHOD OF ALERTING PEDESTRIANS TO VEHICLES

(71) Applicant: Leo Polosajian, Reseda, CA (US)

(72) Inventor: Leo Polosajian, Reseda, CA (US)

( * ) Notice: Subject to any disclaimer, the term of this patent is extended or adjusted under 35 U.S.C. 154(b) by 131 days.

(21) Appl. No.: 17/495,463

(22) Filed: Oct. 6, 2021

(65) Prior Publication Data

US 2023/0106604 A1   Apr. 6, 2023

(51) Int. Cl.
| | |
|---|---|
| H04N 5/44 | (2011.01) |
| B60Q 5/00 | (2006.01) |
| B60W 30/09 | (2012.01) |
| B60W 30/095 | (2012.01) |
| B60W 40/04 | (2006.01) |
| G06N 3/02 | (2006.01) |
| G06V 20/58 | (2022.01) |
| G06V 40/10 | (2022.01) |

(52) U.S. Cl.
CPC ............ *B60Q 5/006* (2013.01); *B60W 30/09* (2013.01); *B60W 30/0956* (2013.01); *B60W 40/04* (2013.01); *G06N 3/02* (2013.01); *G06V 20/58* (2022.01); *G06V 40/10* (2022.01); *B60W 2554/4029* (2020.02); *B60W 2554/4044* (2020.02); *B60W 2554/806* (2020.02)

(58) Field of Classification Search
CPC ... B60Q 5/006; B60W 30/09; B60W 30/0956; B60W 40/04; B60W 2554/4029; B60W 2554/4044; B60W 2554/806; G06N 3/02; G06V 20/58; G06V 40/10
See application file for complete search history.

(56) References Cited

U.S. PATENT DOCUMENTS

| | | | |
|---|---|---|---|
| 2017/0057497 A1* | 3/2017 | Laur | B60W 30/0953 |
| 2018/0236985 A1* | 8/2018 | Kim | G06F 16/2365 |
| 2020/0371527 A1* | 11/2020 | Kim | G06V 20/584 |
| 2021/0232812 A1* | 7/2021 | Jaipuria | G06V 10/95 |
| 2021/0350703 A1* | 11/2021 | Mackenzie | G06T 7/70 |
| 2022/0189308 A1* | 6/2022 | Stent | G08G 1/005 |

* cited by examiner

*Primary Examiner* — Munear T Akki
(74) *Attorney, Agent, or Firm* — Lewis Roca Rothgerber Christie LLP

(57) ABSTRACT

A vehicle configured to alert pedestrians. The vehicle includes a driver-assist system including a memory device, a processor, and at least one camera. The memory device includes instructions which, when executed by the processor, cause the processor to detect, utilizing the at least one camera, at least one pedestrian near the vehicle, determine a proximity of the at least one pedestrian to the vehicle, compare the proximity to a threshold proximity, and automatically emit an audible alert from the vehicle in response to the proximity being less than the threshold proximity.

19 Claims, 4 Drawing Sheets

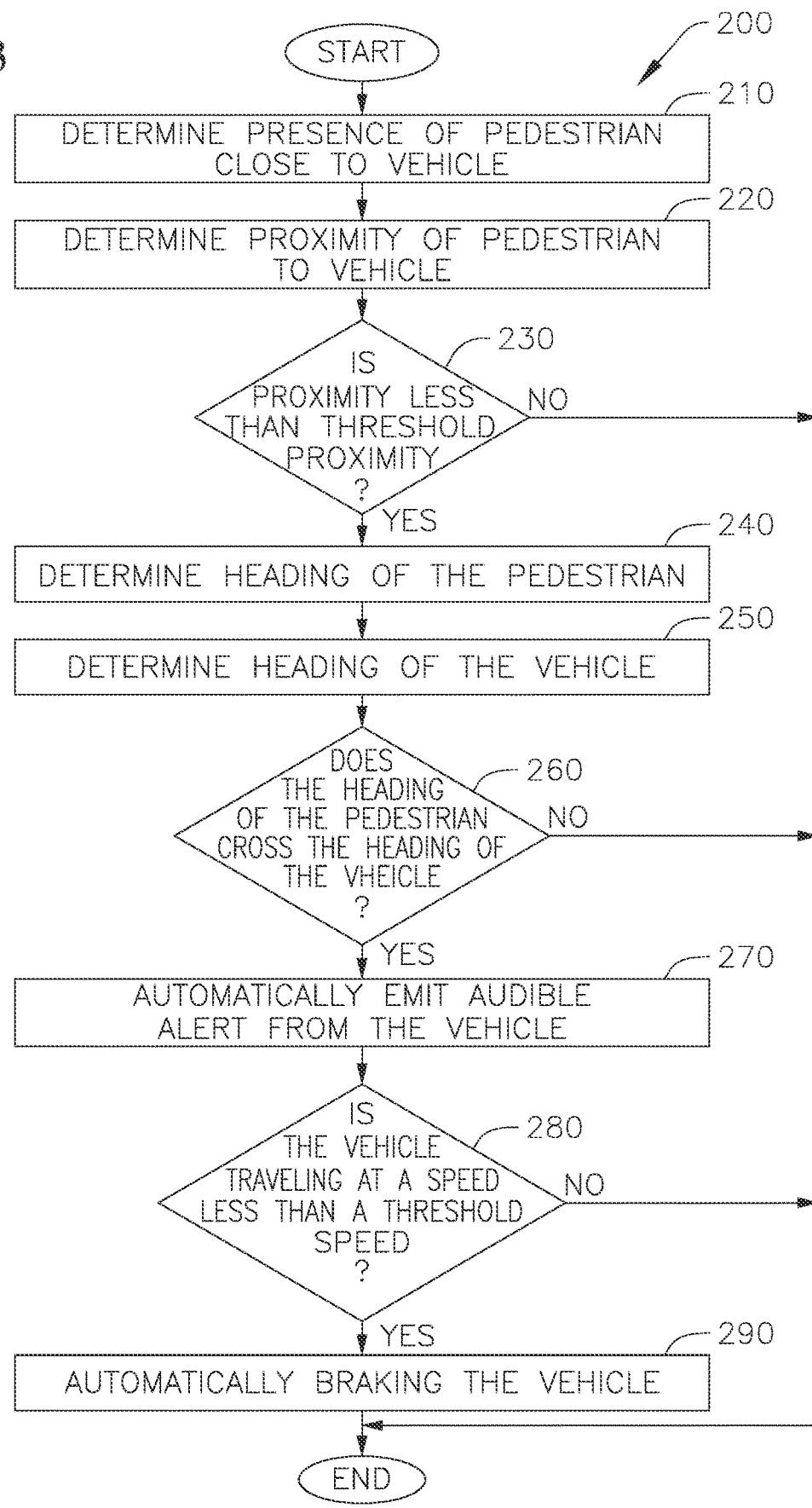

SYSTEM AND METHOD OF ALERTING PEDESTRIANS TO VEHICLES

BACKGROUND

1. Field

The present disclosure relates to systems and methods for alerting pedestrians to a vehicle.

2. Description of the Related Art

Unlike conventional internal combustion engine vehicles, electric vehicles are quiet. Although the quietness of electric vehicles increases the pleasantness of city life by reducing noise pollution, the quietness of electric vehicles presents a hazard to pedestrians because they may be unaware of the presence of the electric vehicle. For instance, pedestrians walking through a parking lot or crossing a street may not be aware that an electric vehicle is approaching. Additionally, while some vehicles include driver alert systems, such as bells or alarms, to alert the driver to the presence of a pedestrian, they lack the ability to alert pedestrians to an approaching vehicle. Accordingly, these systems still rely upon the alertness and responsiveness of the driver to protect pedestrians.

SUMMARY

The present disclosure relates to various embodiments of a vehicle configured to alert pedestrians. In one embodiment, the vehicle includes a driver-assist system including a memory device, a processor, and at least one camera. The memory device includes instructions which, when executed by the processor, cause the processor to detect, utilizing the at least one camera, at least one pedestrian near the vehicle, determine a proximity of the at least one pedestrian to the vehicle, compare the proximity to a threshold proximity, and automatically emit an audible alert from the vehicle in response to the proximity being less than the threshold proximity.

The instructions, when executed by the processor, may further cause the processor to determine a heading of the at least one pedestrian, determine a heading of the vehicle, and emit the audible alert in response to the proximity being less than the threshold proximity and the heading of the at least one pedestrian crossing the heading of the vehicle.

The instructions, when executed by the processor, may further cause the processor to determine a time until the at least one pedestrian crosses the heading of the vehicle, and to vary a volume of the audible alert based on the time.

The instructions, when executed by the processor, may cause the processor to track movement of the at least one pedestrian to determine the heading of the pedestrian.

The instructions, when executed by the processor, may cause the processor to determine a direction in which the at least one pedestrian is facing to determine the heading of the pedestrian.

The instructions, when executed by the processor, may cause the processor to determine the heading of the vehicle based on navigation directions input into the vehicle, a turn signal indicator of the vehicle, a gear selection of the vehicle, steering wheel input into a steering wheel of the vehicle, an orientation of front tires of the vehicle, and/or motion of the vehicle.

The audible alert may be a honk emitted from a horn of the vehicle, or a verbal warning emitted from a speaker of the vehicle.

The threshold proximity may be less than approximately 10 feet.

The instructions may include an artificial neural network trained to identify the at least one pedestrian.

The at least one camera may be a stereo-camera.

The driver-assist system may further include at least one sensor. The sensor may be an ultrasonic sensor, a lidar, and/or a radar.

The instructions, when executed by the processor, may further cause the processor to determine a heading of the at least one pedestrian, determine a heading of the vehicle, and automatically brake the vehicle in response to the proximity being less than the threshold proximity, the heading of the at least one pedestrian crossing the heading of the vehicle, and a velocity of the vehicle being below a threshold velocity.

The present disclosure also relates to various embodiments of methods of alerting at least one pedestrian to the presence of a vehicle. In one embodiment, the method includes detecting, utilizing the at least one camera of a driver-assist system of the vehicle, at least one pedestrian near the vehicle, determining a proximity of the at least one pedestrian to the vehicle, comparing the proximity to a threshold proximity, and automatically emitting an audible alert from the vehicle in response to the proximity being less than the threshold proximity.

The method may further include determining a heading of the at least one pedestrian, determining a heading of the vehicle, and emitting the audible alert in response to the proximity being less than the threshold proximity and the heading of the at least one pedestrian crossing the heading of the vehicle.

The method may also include determining a time until the at least one pedestrian crosses the heading of the vehicle, and varying a volume of the audible alert based on the time.

Determining the heading of the pedestrian may include tracking movement of the at least one pedestrian.

Determining the heading of the pedestrian may include determining a direction in which the at least one pedestrian is facing.

Determining the heading of the vehicle may be based on navigation directions input into the vehicle, a turn signal indicator of the vehicle, a gear selection of the vehicle, steering wheel input into a steering wheel of the vehicle, an orientation of front tires of the vehicle, and/or motion of the vehicle.

The audible alert may be a honk emitted from a horn of the vehicle, or a verbal warning emitted from a speaker of the vehicle.

The threshold proximity may be less than approximately 10 feet.

The method may also include determining a heading of the at least one pedestrian, determining a heading of the vehicle, and automatically braking the vehicle in response to the proximity being less than the threshold proximity, the heading of the at least one pedestrian crossing the heading of the vehicle, and a velocity of the vehicle being below a threshold velocity.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable system or method of alerting pedestrians to the presence of a vehicle.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 3 is a flowchart illustrating tasks of a method of alerting a pedestrian to the presence of a vehicle according to one embodiment of the present disclosure.

DETAILED DESCRIPTION

The present disclosure relates to various embodiments of a system and method of automatically alerting pedestrians to the presence of a vehicle. The systems and methods of the present disclosure may be used to automatically alert pedestrians who are distracted or not attentive to their surroundings. The systems and methods of the present disclosure may be utilized to automatically alert pedestrians to the presence of electric vehicles that are significantly quieter than internal combustion engine vehicles, and are therefore more likely to go unnoticed by a pedestrian. In this manner, the systems and methods of the present disclosure are configured to mitigate the likelihood of accidents between vehicles and pedestrians.

Figure 1A:
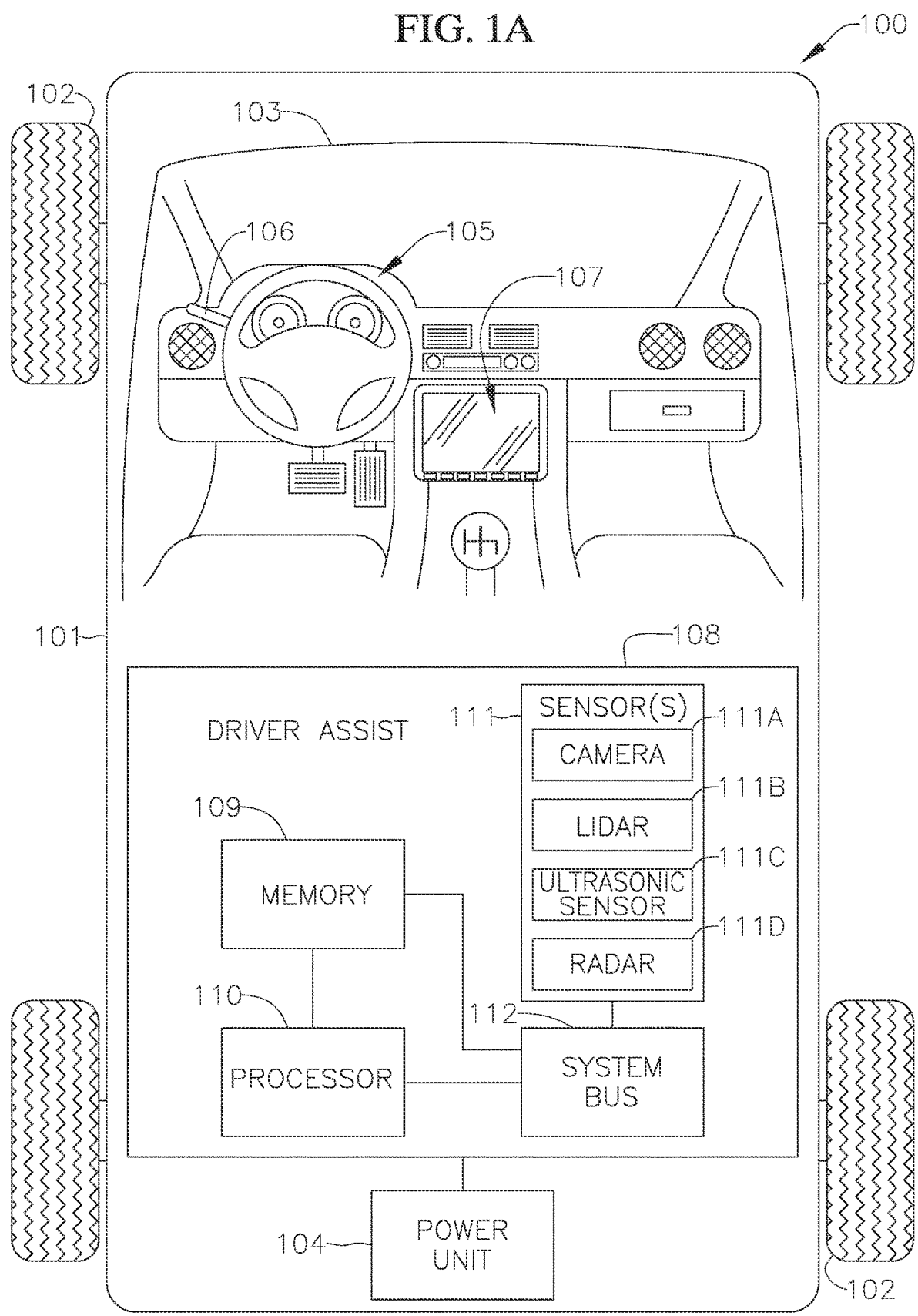
FIGS. 1A-1B are schematic views of a vehicle according to one embodiment of the present disclosure.
Figure 1B:
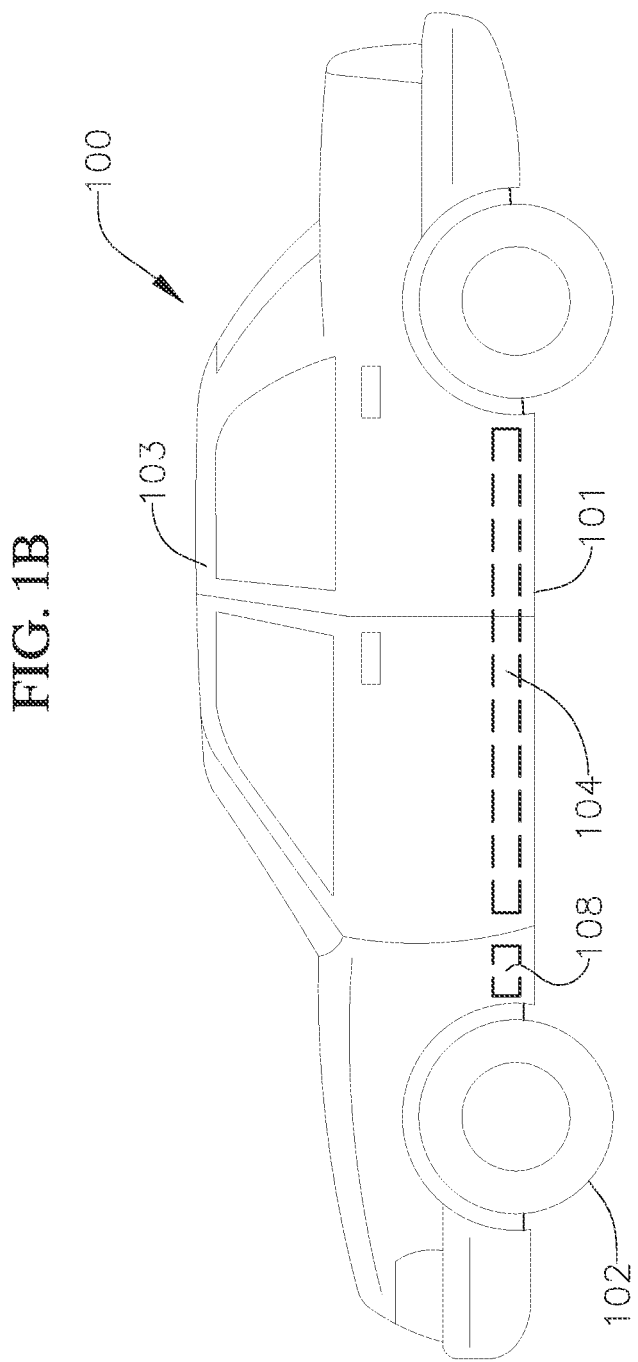

FIGS. 1A-1B are schematic views of a vehicle 100 (e.g., an electric vehicle) according to one embodiment of the present disclosure. In the illustrated embodiment, the vehicle 100 includes a chassis 101, a plurality of wheels 102 coupled to the chassis 101, a passenger cabin 103 supported on the chassis 101, a power unit 104 (e.g., an electric motor coupled to a rechargeable battery and/or an internal combustion engine) configured to drive the wheels 102, a steering wheel 105 coupled to the wheels 102, a turn-signal indicator 106, a navigation system 107, and a driver-assist system 108 (a self-driving or a semi-autonomous driving system). The driver-assist system 108 includes a memory device 109, a processor 110, and at least one sensor 111. The memory device 109, the processor 110, and the at least one sensor 111 are configured to communicate with each other over a system bus 112. In one or more embodiments, the memory device 109 of the vehicle 100 may include persistent memory, such as NAND flash memory, for storing instructions. The sensor 111 may be selected from at least one camera 111a (e.g., a stereo-camera) configured to capture scene images around the vehicle 100, a lidar 111b configured to emit light beams to detect the presence of objects and individuals around the vehicle 100, an ultrasonic sensor 111c configured to ultrasonic beams to detect the presence of objects and individuals around the vehicle 100, and/or a radar 111d configured to emit radio waves to detect the presence of objects and individuals around the vehicle 100. In the illustrated embodiment, the vehicle 100 also includes a gear selector 112 connected to an automatic or manual transmission 113.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example, a processor may include two processors, an FPGA and a CPU, interconnected on a PWB.

The instructions stored in the memory device 109, when executed by the processor 110, cause the processor 110 to identify the presence of at least one pedestrian in proximity to the vehicle 100. In one or more embodiments, the instructions stored in the memory device 109 include an artificial neural network trained to trained to classify objects in the scene images (i.e., the environment around the vehicle 100) captured by the camera 111a. The artificial neural network may be trained by supervised learning (e.g., presented with positive samples of images or video containing an individual, and negative samples of images or video not containing an individual) or by unsupervised learning. In one or more embodiments, the artificial neural network is trained to classify environmental or scenic objects as either an individual (e.g., a pedestrian) or not an individual (e.g., natural environmental objects, such as trees, or inanimate structural objects, such as street lights, stop signs, and buildings). That is, in one or more embodiments, the artificial neural network is trained to perform image segmentation (e.g., semantic segmentation to identify each pixel belonging to a particular class (an individual) or instance segmentation to separately identify distinct objects belonging to the same class (separate individuals)). In one or more embodiments, instructions stored in the memory device 109, when executed by the processor 110, cause the processor 110 to input environmental scene data (e.g., images or video captured by the camera 111a) into an input layer of the artificial neural network, and to receive an output from an output layer of the artificial neural network, as a result of the inference process of the artificial neural network, that classifies the objects in the images or video captured by the camera 111a. For instance, in one or more embodiments, the instructions stored in the memory device 109, when executed by the processor 110, cause the processor 110 to input photos or video captured by the camera 111a of the vehicle 100 into an input layer of the artificial neural network and to receive an output from an output layer of the artificial neural network.

In one or more embodiments, the instructions stored in the memory device 109, when executed by the processor 110, cause the processor 110 to determine a proximity of the pedestrian to the vehicle 100. For example, in one or more embodiments, the instructions stored in the memory device 109, when executed by the processor 110, are configured to utilize images captured by the stereo-camera 111a of the vehicle 100 to determine the proximity (i.e., the distance) of the pedestrian to the vehicle 100. In one or more embodiments, the instructions stored in the memory device 109, when executed by the processor 110, are configured to utilize signals captured by the lidar 111b, the ultrasonic sensor 111c, and/or the radar 111d to determine the proximity (i.e., the distance) of the pedestrian to the vehicle 100 (e.g., the time between the transmission of the light signal from the lidar 111b and the return of the light signal to the lidar 111b after reflecting off an object or an individual; the time between the transmission of the ultrasonic signal from the ultrasonic sensor 111c and the return of the ultrasonic signal to the ultrasonic sensor 111c after reflecting off an object or an individual; or the time between the transmission of the radio frequency signal from the radar 111d and the return of the radio frequency signal to the radar 111d after reflecting off an object or an individual).

In one or more embodiments, the instructions stored in the memory device 109, when executed by the processor 110, cause the processor 110 to compare the proximity of the pedestrian to the vehicle 100 to a threshold proximity. The threshold proximity may be hard-coded into the memory device 109 of the vehicle 100 or may be selected by a user of the vehicle 100. The threshold proximity may be less than approximately 10 feet, such as approximately 5 feet or less.

Figure 2:
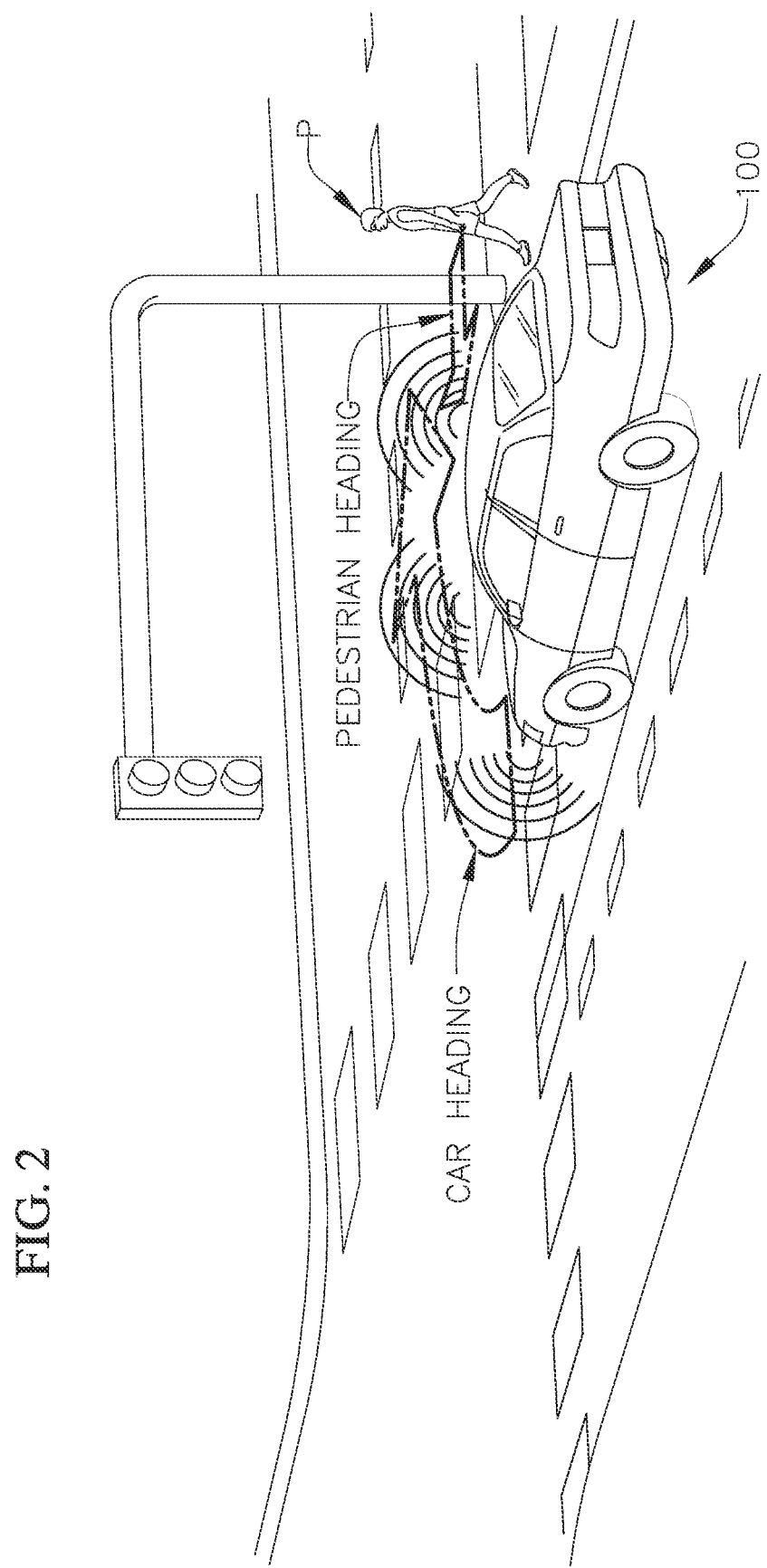
FIG. 2 is a plan view illustrating a vehicle alerting a pedestrian according to one embodiment of the present disclosure.

In one or more embodiments, the instructions stored in the memory device 109, when executed by the processor 110, cause the processor 110 to determine that the pedestrian (detected in the manner described above) is crossing or intersecting (or moving to cross or intersect) a path of the vehicle 100. For instance, in one or more embodiments, the instructions stored in the memory device 109, when executed by the processor 110, cause the processor 110 to track movement of the pedestrian to determine a heading vector of the pedestrian. In one or more embodiments, the instructions stored in the memory device 109, when executed by the processor, cause the processor 110 to determine a direction in which the pedestrian is facing to determine a heading vector of the pedestrian (e.g., the artificial neural network is trained to identify facial features of pedestrians in a scene captured by the camera 111a of the vehicle 100 to determine the direction in which the pedestrian is heading). In one or more embodiments, the instructions stored in the memory device 109, when executed by the processor 110, cause the processor 110 to determine the heading vector of the vehicle 100 based on inputs to the steering wheel 105 (e.g., the steering wheel 105 is turned to the left or the right), the direction in which the front wheels 102 of the vehicle 100 are facing (e.g., straight forward, to the right, or to the left), the status of the turn signal indicator 106 (e.g., the left turn signal is turned on or the right turn signal is turned on), the gear selected by the gear selector 112 (e.g., reverse or drive), and/or navigation directions input by a user (e.g., a waypoint) into the navigation system 107 and directions necessary to reach the destination, or any combination thereof. For instance, as illustrated in FIG. 2, when the vehicle 100 is in a right turn lane and the turn-signal indicator 106 has been used to turn on the right turn signal of the vehicle 100, the front wheels 102 of the vehicle 100 point to the right, the steering wheel 105 has been turned to the right, and/or the navigation directions input into the navigation system 107 indicate that the vehicle 100 needs to turn right to reach the destination, the heading of the vehicle 100 is to the right, as indicated by the arrow "Car Heading". Additionally, as illustrated in FIG. 2, when a pedestrian P is facing to the left and/or is moving to the left (e.g., as determined by the artificial neural network of the driver-assist system 108), the heading of the pedestrian is to the left, as indicated by the arrow "Pedestrian Heading." Furthermore, as illustrated in FIG. 2, the heading of the vehicle 100 crosses (or intersects) the heading of the pedestrian.

Alerting pedestrians in response to the proximity between the pedestrian and the vehicle 100 being less than the threshold proximity and the heading of the pedestrian crossing the heading of the vehicle 100 avoids altering pedestrians when pedestrians are moving toward the vehicle but not at risk of being struck by the vehicle 100, which might otherwise occur if the vehicle 100 was configured to alert pedestrians based on only the proximity (or the change in proximity) of the pedestrian to the vehicle 100. For instance, when a pedestrian is walking on a sidewalk alongside the vehicle and/or when the pedestrian is crossing the road behind the vehicle, a vehicle configured to alert pedestrians based only on the proximity (or the change in proximity) of the pedestrian to the vehicle may inadvertently alert the pedestrian, which may annoy pedestrians and cause pedestrians to ignore future warnings or alerts that would otherwise actually prevent an accident. In one or more embodiments, the instructions stored in the memory device 109, when executed by the processor 110, cause the vehicle 100 not to alert when the heading of the vehicle 100 is stopped and the heading of the vehicle 100 is straight forward (e.g., the steering wheel 105 is not turned to the left or the right, the front wheels 102 of the vehicle 100 are facing straight forward, the turn signal indicator 106 is turned off, the gear selector 112 is in drive, and/or the navigation directions input by a user into the navigation system 107 indicate that it is necessary for the vehicle 100 to drive straight to reach the destination). Not alerting pedestrians when the vehicle 100 is stopped and the heading of the vehicle 100 is straight forward is configured to avoid alerting pedestrians who are, for example, crossing the street at a crosswalk in front of the vehicle 100 when the vehicle 100 is stopped at a red light and is intending to drive straight.

In the illustrated embodiment, the instructions stored in the memory device 109, when executed by the processor 110, cause the vehicle 100 to emit an audible alert to warn the pedestrian of the presence of the vehicle 100 in response to the proximity of the pedestrian to the vehicle 100 being below the threshold proximity, and the path of the pedestrian is crossing (or intersecting) the path of the vehicle 100. For instance, in one or more embodiments, the audible alert from the vehicle may include activating the horn of the vehicle and/or emitting a tone and/or a verbal warning (e.g., a verbal message stating, "beware of approaching vehicle") from a speaker of the vehicle.

In one or more embodiments, the audible alert emitted from the vehicle may vary depending on one or more factors. For example, in one or more embodiments, the instructions stored in the memory device 109, when executed by the processor 110, cause the vehicle 100 to calculate or determine a time until the pedestrian crosses the path of the vehicle 100 and to emit an audible alert the volume and/or frequency of which depends on the time until the pedestrian crosses the path of the vehicle (e.g., the volume and/or frequency of the audible alert increases as the time until the pedestrian crosses the path of the vehicle 100 decreases). In one or more embodiments, the instructions stored in the memory device 109, when executed by the processor 110, cause the vehicle 100 to calculate or determine the time until the pedestrian crosses the path of the vehicle 100 based on the distance between the pedestrian and the vehicle 100, the speed(s) at which the vehicle 100 and the pedestrian are moving, and the directions in which the pedestrian and the vehicle 100 are heading.

In the illustrated embodiment, the instructions stored in the memory device 109, when executed by the processor 110, cause the vehicle 100 to automatically brake in response to the proximity of the pedestrian to the vehicle 100 being below the threshold proximity, and the path of the pedestrian crossing (or intersecting) the path of the vehicle 100. In one or more embodiments, the instructions stored in the memory device 109, when executed by the processor 110, cause the vehicle 100 to automatically brake only when the vehicle is traveling at a speed less than a threshold speed, such as approximately 10 mph, approximately 15 mph, or approximately 20 mph (e.g., the instructions stored in the memory device 109, when executed by the processor 110, cause the vehicle 100 to automatically brake in response to the proximity of the pedestrian to the vehicle 100 being below the threshold proximity, the path of the pedestrian crossing (or intersecting) the path of the vehicle 100, and the speed of the vehicle 100 being less than the threshold speed). Otherwise, automatically applying the brakes when the vehicle 100 is traveling at a high speed above the threshold speed may cause another vehicle traveling behind the vehicle 100 to crash (e.g., rear end the vehicle 100).

FIG. 3 is a flowchart illustrating tasks of a method 200 of alerting one or more pedestrians to the presence of a vehicle. In the illustrated embodiment, the method 200 includes a task 210 of determining the presence of at least one pedestrian close to a vehicle. In one or more embodiments, the task 210 may include capturing scene images or video by a camera of the vehicle, and processing the captured images or video with an artificial neural network trained to classify objects in the images or video. The artificial neural network may be trained by supervised learning (e.g., presented with positive samples of images or video containing an individual, and negative samples of images or video not containing an individual) or by unsupervised learning. In one or more embodiments, the artificial neural network is trained to classify environmental or scenic objects as either an individual (e.g., a pedestrian) or not an individual (e.g., natural environmental objects, such as trees, or inanimate structural objects, such as street lights, stop signs, and buildings). In one or more embodiments, the artificial neural network is trained to perform image segmentation (e.g., semantic segmentation to identify each pixel belonging to a particular class (an individual) or instance segmentation to separately identify distinct objects belonging to the same class (separate individuals)). In one or more embodiments, the task 210 includes inputting environmental scene data (e.g., images or video captured by the camera) into an input layer of the artificial neural network, and receiving an output from an output layer of the artificial neural network, as a result of the inference process of the artificial neural network, that classifies the objects in the images or video captured by the camera.

In the illustrated embodiment, the method 200 also includes a task 220 of determining or calculating a proximity (i.e., a distance) of the at least one pedestrian to the vehicle. In one or more embodiments, the task 220 utilizes a stereo vision system to determine the proximity (i.e., the distance) of the pedestrian to the vehicle. That is, in one or more embodiments, the task 220 utilizes a computer vision system based on stereoscopic ranging techniques to calculate the proximity (i.e., the distance) of the pedestrian to the vehicle. For instance, in one or more embodiments, the task 220 includes capturing images or video of a scene around the vehicle with a first camera of a stereo vision system and a second camera of the stereo vision system, and utilizing the disparity of the positions of the pedestrians in the images or videos captured by the first and second cameras to compute the proximity (i.e., the distance) of the pedestrian to the vehicle. In one or more embodiments, the task 220 includes utilizing signals captured by a lidar of the vehicle, an ultrasonic sensor of the vehicle, and/or a radar of the vehicle to determine the proximity (i.e., the distance) of the pedestrian to the vehicle (e.g., the task 220 may include calculating the distance between the pedestrian and the vehicle based on the time between the transmission of the light signal from the lidar and the return of the light signal to the lidar after reflecting off an object or an individual; the time between the transmission of the radio frequency signal from the radar and the return of the radio frequency signal to the radar after reflecting off an object or an individual; or the time between the transmission of the ultrasonic signal from the ultrasonic sensor and the return of the ultrasonic signal to the ultrasonic sensor after reflecting off an object or an individual).

In the illustrated embodiment, the method 200 also includes a task 230 of comparing the proximity of the pedestrian to the vehicle to a threshold proximity. In one or more embodiments, the threshold proximity may be less than approximately 10 feet, such as approximately 5 feet or less.

In one or more embodiments, the method 200 also includes a task 240 of determining a heading of the at least one pedestrian and a task 250 of determining a heading of the vehicle. In one or more embodiments, the task 240 includes tracking movement of the pedestrian to determine a heading vector of the pedestrian. In one or more embodiments, the task 240 includes determining a direction in which the pedestrian is facing to determine a heading vector of the pedestrian. The task 240 of determining the direction in which the pedestrian is facing may include inputting an image or a video of the pedestrian into an input layer of artificial neural network trained to identify facial features of pedestrians. In one or more embodiments, the task 250 includes determining the heading vector of the vehicle based on inputs to the steering wheel (e.g., the steering wheel is turned to the left or the right), the direction in which the front wheels of the vehicle are facing (e.g., straight forward, to the right, or to the left), a turn signal indicator (e.g., the left turn signal or the right turn signal is on), a gear selection (e.g., reverse or drive), and/or navigation directions input by a user (e.g., a waypoint) and directions necessary to reach the destination, or any combination thereof.

In the illustrated embodiment, the method 200 also includes a task 260 of determining if the heading of the pedestrian (as determined in task 240) crosses or intersects the heading of the vehicle (as determined in task 250).

In the illustrated embodiment, the method 200 also includes a task 270 of automatically emitting an audible alert from the vehicle in response to the proximity of the at least one pedestrian to the vehicle being less than the threshold proximity (as determined in task 230) and the heading of the at least one pedestrian crossing the heading of the vehicle (as determined in task 260). In one or more embodiments, the task 270 may include automatically honking a horn of the vehicle or automatically emitting a verbal command or warning from a speaker of the vehicle. Additionally, in one or more embodiments, the method 200 may include a task of determining a time until the pedestrian crosses the path of the vehicle and to emit an audible alert the volume of which depends on the time until the pedestrian crosses the path of the vehicle (e.g., the volume of the audible alert emitted in task 270 increases as the time until the pedestrian crosses the path of the vehicle decreases). In this manner, the method 200 is configured to automatically alert pedestrians to the presence of a vehicle and thereby mitigate the likelihood of accidents between vehicles and pedestrians.

In the illustrated embodiment, the method 200 also includes a task 280 of determining if the vehicle 100 is traveling at a speed less than a threshold speed. The threshold speed may be hard-coded into the memory device 109 of the vehicle 100 or may be selected by a user of the vehicle 100. In one or more embodiments, the threshold speed may be approximately 10 mph, approximately 15 mph, or approximately 20 mph. The threshold speed may be set to correspond to the maximum (or substantially the maximum) speed of the vehicle 100 at which the vehicle 100 can safely automatically brake.

In the illustrated embodiment, the method 200 also includes a task 290 of automatically braking the vehicle in response to the proximity of the at least one pedestrian to the vehicle being less than the threshold proximity (as determined in task 230) and the heading of the at least one pedestrian crossing the heading of the vehicle (as determined in task 260). In one or more embodiments, the task 290 of automatically braking the vehicle is performed in response to the proximity of the at least one pedestrian to the vehicle being less than the threshold proximity (as determined in task 230), the heading of the at least one pedestrian crossing the heading of the vehicle (as determined in task 260), and the vehicle traveling at a speed less than a threshold speed (as determined in task 280), such as approximately 10 mph or less, approximately 15 mph or less, or approximately 20 mph or less. Otherwise, automatically applying the brakes when the vehicle 100 is traveling at a high speed above the threshold speed may cause another vehicle traveling behind the vehicle 100 to crash (e.g., rear end the vehicle 100). In one or more embodiment, the method 200 may not include the tasks 280 and 290 of determining if the vehicle 100 is traveling at a speed less than a threshold speed and automatically braking the vehicle 100.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described systems and methods of operation can be practiced without meaningfully departing from the principles, spirit, and scope of this invention, as set forth in the following claims, and equivalents thereof.

What is claimed is:

1. A vehicle configured to alert pedestrians, the vehicle comprising: a driver-assist system comprising: a memory device; a processor; and at least one camera, wherein the memory device includes instructions which, when executed by the processor, cause the processor to: detect, utilizing the at least one camera, at least one pedestrian near the vehicle; determine a proximity of the at least one pedestrian to the vehicle; compare the proximity to a threshold proximity; determine a heading of the at least one pedestrian: determine a heading of the vehicle based on at least two of navigation directions input into the vehicle, a turn signal indicator of the vehicle, a gear selection of the vehicle, steering wheel input into a steering wheel of the vehicle, an orientation of front tires of the vehicle, and motion of the vehicle: and automatically emit an audible alert from the vehicle in response to the proximity being less than the threshold proximity and the heading of the at least one pedestrian crossing the heading of the vehicle.

2. The vehicle of claim 1, wherein the instructions, when executed by the processor, further cause the processor to: determine a time until the at least one pedestrian crosses the heading of the vehicle; and
vary at least one selected from a volume and a frequency of the audible alert based on the time.

3. The vehicle of claim 1, wherein the instructions, when executed by the processor, cause the processor to track movement of the at least one pedestrian to determine the heading of the pedestrian.

4. The vehicle of claim 1, wherein the instructions, when executed by the processor, cause the processor to determine a direction in which the at least one pedestrian is facing to determine the heading of the pedestrian.

5. The vehicle of claim 1, wherein the audible alert is a honk emitted from a horn of the vehicle.

6. The vehicle of claim 1, wherein the audible alert is a verbal warning emitted from a speaker of the vehicle.

7. The vehicle of claim 1, wherein the threshold proximity is less than approximately 10 feet.

8. The vehicle of claim 1, wherein the instructions comprise an artificial neural network trained to identify the at least one pedestrian.

9. The vehicle of claim 1, wherein the at least one camera is a stereo-camera.

10. The vehicle of claim 1, wherein the driver-assist system further comprises at least one sensor selected from the group consisting of an ultrasonic sensor, a lidar, and a radar.

11. The vehicle of claim 1, wherein the instructions, when executed by the processor, further cause the processor to:
determine a heading of the at least one pedestrian;
determine a heading of the vehicle; and
automatically brake the vehicle in response to the proximity being less than the threshold proximity, the heading of the at least one pedestrian crossing the heading of the vehicle, and a velocity of the vehicle being below a threshold velocity.

12. A method of alerting at least one pedestrian to the presence of a vehicle, the method comprising: detecting, utilizing the at least one camera of a driver-assist system of the vehicle, at least one pedestrian near the vehicle; determining a proximity of the at least one pedestrian to the vehicle; comparing the proximity to a threshold proximity; determining a heading of the at least one pedestrian; determining a heading of the vehicle based on at least two of navigation directions input into the vehicle, a turn signal indicator of the vehicle, a gear selection of the vehicle, steering wheel input into a steering wheel of the vehicle, an orientation of front tires of the vehicle, and motion of the vehicle; and automatically emitting an audible alert from the vehicle in response to the proximity being less than the threshold proximity and the heading of the at least one pedestrian crossing the heading of the vehicle.

13. The method of claim 12, further comprising:
determining a time until the at least one pedestrian crosses the heading of the vehicle; and
varying a volume of the audible alert based on the time.

14. The method of claim 12, wherein the determining of the heading of the pedestrian comprises tracking movement of the at least one pedestrian.

15. The method of claim 12, wherein the determining of the heading of the pedestrian comprises determining a direction in which the at least one pedestrian is facing.

16. The method of claim 12, wherein the audible alert is a honk emitted from a horn of the vehicle.

17. The method of claim 12, wherein the audible alert is a verbal warning emitted from a speaker of the vehicle.

18. The method of claim 12, wherein the threshold proximity is less than approximately 10 feet.

19. The method of claim 12, further comprising:
automatically braking the vehicle in response to the proximity being less than the threshold proximity, the heading of the at least one pedestrian crossing the heading of the vehicle, and a velocity of the vehicle being below a threshold velocity.

* * * * *